(12) United States Patent
Chen

(10) Patent No.: US 7,785,521 B1
(45) Date of Patent: Aug. 31, 2010

(54) METHOD OF MANUFACTURING SHOE OUTSOLES FROM WASTE PLANT FIBERS

(76) Inventor: Sung-Ho Chen, No. 52-1, Pucai Rd., Pu S. Village, Puyan Shiang, Changhua County (TW)

( * ) Notice: Subject to any disclaimer, the term of this patent is extended or adjusted under 35 U.S.C. 154(b) by 0 days.

(21) Appl. No.: 12/549,368

(22) Filed: Aug. 28, 2009

(51) Int. Cl.
B29C 45/00 (2006.01)
B29B 13/10 (2006.01)
B29B 17/00 (2006.01)

(52) U.S. Cl. .................................. 264/328.18
(58) Field of Classification Search ............ 264/328.17, 264/328.18
See application file for complete search history.

(56) References Cited

U.S. PATENT DOCUMENTS 2,643,234 A * 6/1953 Backus ........................ 524/271
5,346,934 A * 9/1994 Chriss ............................ 524/11
2007/0228601 A1 * 10/2007 Chen ............................ 264/244

* cited by examiner

Primary Examiner—Jill L Heitbrink
(74) Attorney, Agent, or Firm—Ching-Ling Huang

(57) ABSTRACT

A method of manufacturing shoe outsoles from waste plant fibers includes steps of: bleaching plant fiber powders; activating the plant fiber powders through a graft reaction process; mixing the plant fiber powders and recycle rubber powders to enhance physical properties of the plant fiber powders; adding a homogenizing agent to fully blend the hydrophilic plant fiber powders and the lipophilic recycle rubber powders to form a recycled material; mixing the recycled material and thermoplastic rubber into a mixture; aging the mixture for an aging time; granulating the mixture; and producing a shoe outsole through an injection molding process. Thus a novel approach is provided to produce shoe products. Waste plants or rubber can be recycled to improve environmental conservation and protection.

6 Claims, 4 Drawing Sheets

METHOD OF MANUFACTURING SHOE OUTSOLES FROM WASTE PLANT FIBERS

FIELD OF THE INVENTION

The present invention relates to manufacturing of shoe outsoles and particularly to a method of manufacturing shoe outsoles from waste plant fibers.

BACKGROUND OF THE INVENTION

With constant growing of population and social development in the world, the resources on earth are consumed at an alarming rate, and depletion of these resources becomes an urgent crisis. With this concern in mind, shoe industry devotes a lot of investments in research and development trying to make shoe outsoles by combining plant waste and thermoplastic rubber (TPR) and hopes to avoid over consumption of petrochemical resources and achieve energy saving and reduce carbon footprint, and alleviate greenhouse effect and global warming.

Plant waste generally cannot withstand high temperature due to plant characteristics. The thermoplastic rubber (TPR) process in the conventional technique mentioned above is performed at a high temperature. Hence, in the conventional manufacturing process of joining the plant waste and thermoplastic rubber (TPR) for making shoe outsoles, the plant waste is darkened at the high temperature. This not only makes the appearance not attractive, the finished products also have unstable physical properties and shorter lifetime.

How to develop a technique to form a stronger joining between the hydrophilic plant waste and the lipophilic thermoplastic rubber (TPR) to overcome the shortcomings of the conventional techniques is an important issue in the shoe industry. The present invention aims to provide an eco-friendly approach to comply with the 4R principles: Reduce, Reuse, Recycle and Renewable.

SUMMARY OF THE INVENTION

Therefore the primary object of the present invention is to provide a method of manufacturing shoe outsoles from waste plant fibers.

The method according to the present invention includes steps of: crushing plant wastes and drying the crushed plant wastes to become plant fiber powders; bleaching the plant fiber powders; activating the surface fibers of the plant fiber powders through a graft reaction process; mixing the plant fiber powders and recycle rubber powders to enhance physical properties of the plant fiber powders; adding a homogenizing agent to fully blend the hydrophilic plant fiber powders and the lipophilic recycle rubber powders to form a recycled material; mixing the recycled material and a thermoplastic rubber (TPR) into a mixture; aging the mixture for an aging time; granulating the mixture; and producing a shoe outsole through an injection molding process.

The aforesaid method of the present invention provides many benefits, notably:

1. More comprehensive utilization of the recycle rubber powders can be realized. The undesirable physical properties of the shoes resulting from the conventional techniques can be improved. A stronger joining can be formed between the hydrophilic plant fiber powders and the lipophilic rubber.

2. The recycle rubber powders can be obtained from wider sources, such as rubber wastes of general household goods. The plant wastes can also be recycled and reused to make shoe outsoles.

It greatly enhances reusability of earth resources, and offers a new direction for making shoe products.

The foregoing, as well as additional objects, features and advantages of the present invention will be more readily apparent from the following detailed description, which proceeds with reference to the accompanying embodiments and drawings. The embodiments serve merely for illustrative purpose and are not the limitation of the present invention.

DETAILED DESCRIPTION OF THE PREFERRED EMBODIMENTS

Figure 1:
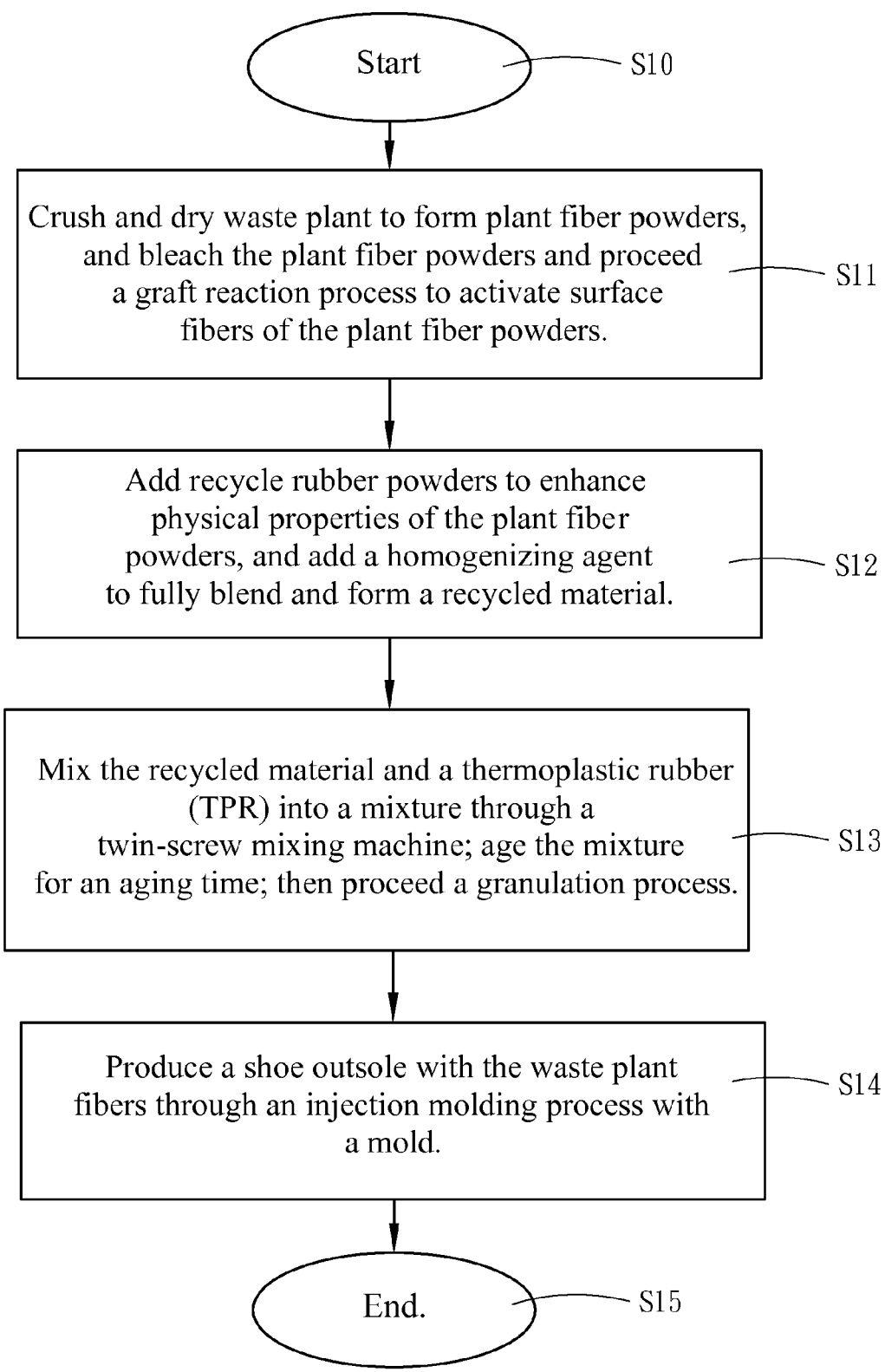
FIG. 1 is a flowchart of the manufacturing method of the present invention.
Figure 2:
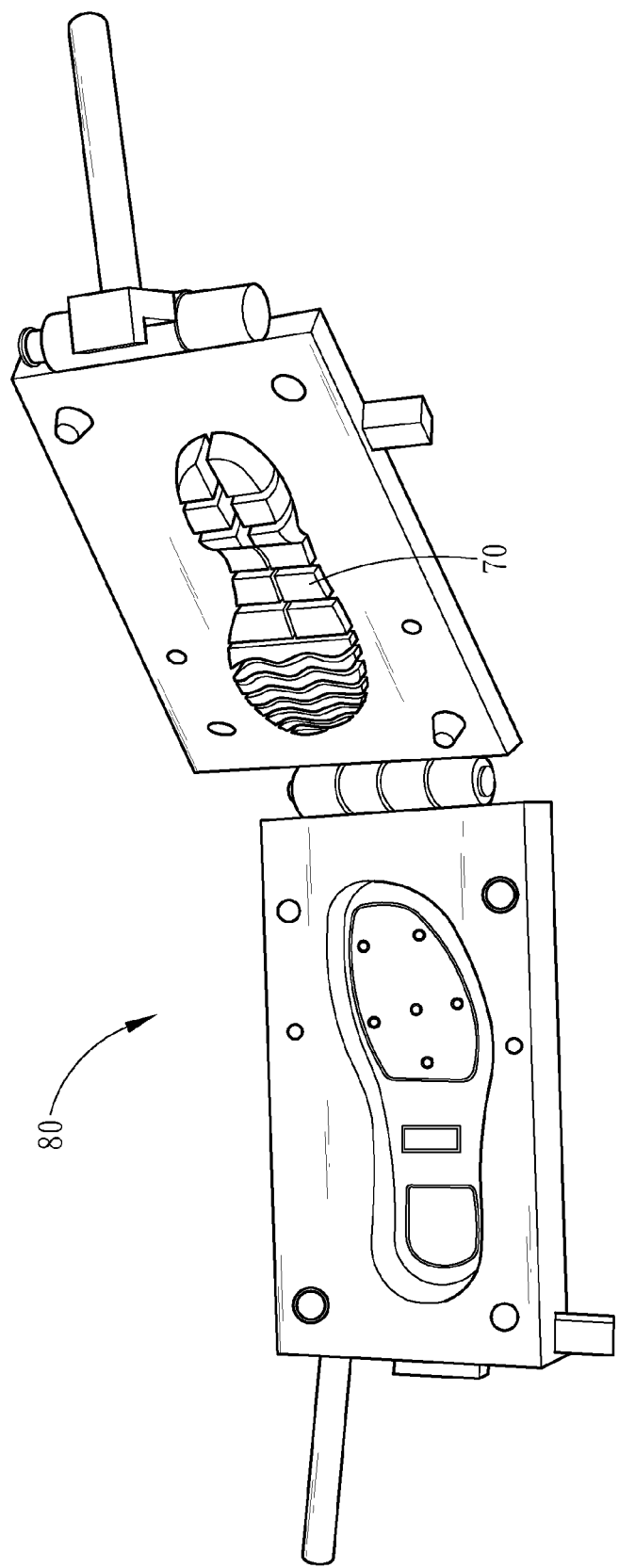
FIG. 2 is a schematic view of a mold for making a shoe product according to the present invention.
Figure 3:
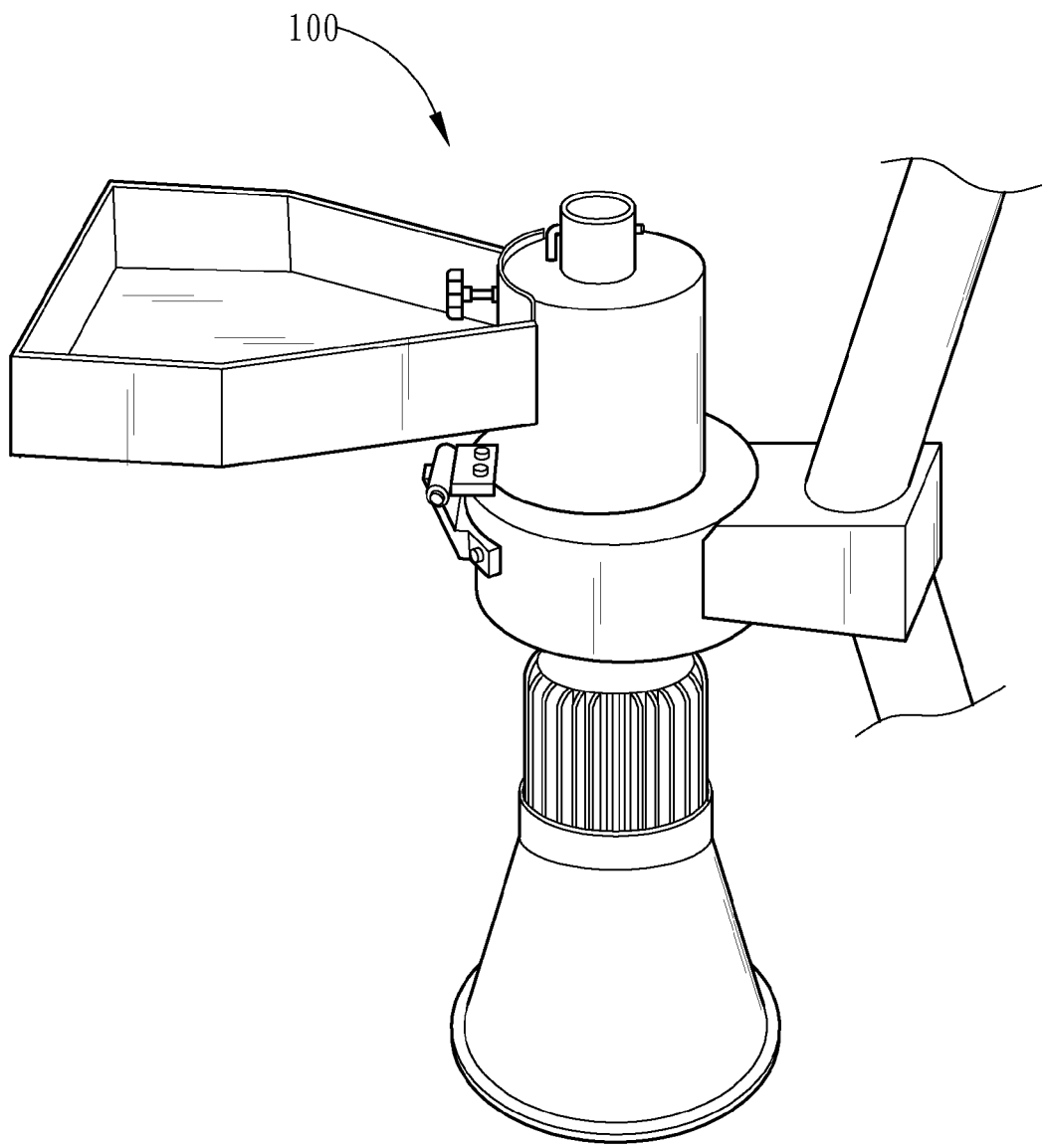
FIG. 3 is a schematic view of a grinding mill of the present invention.
Figure 4:
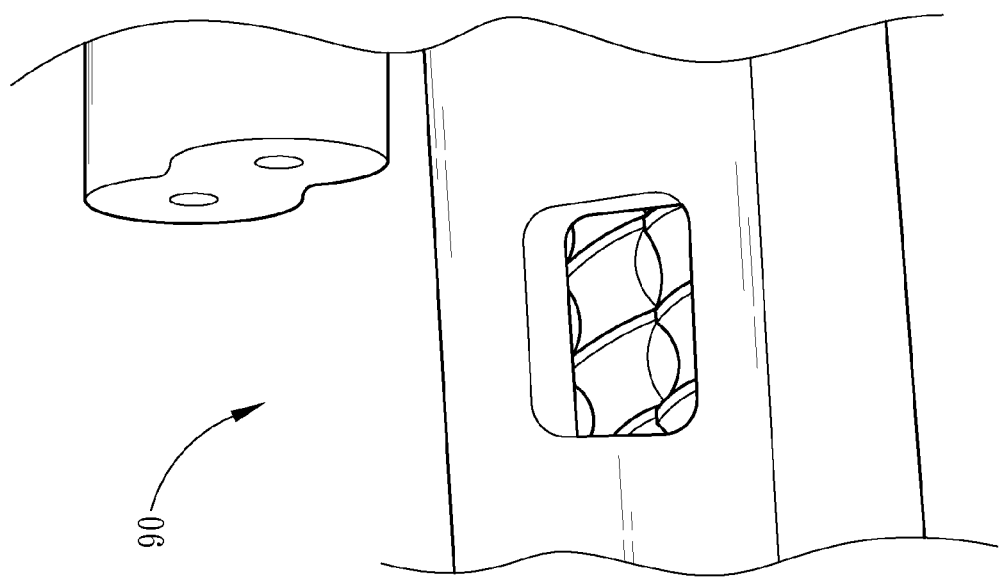
FIG. 4 is a twin-screw mixing machine of the present invention.

Please refer to FIGS. 1 through 4 for the method of manufacturing shoe outsoles of the present invention and a shoe product mold 80, a grinding mill 100 and a twin-screw mixing machine 90 used in the method. FIG. 1 illustrates the flowchart of the method of the present invention for making the shoe outsoles with waste plant fibers. The method includes steps S10 to S15.

Step S10: Start.

Step S11: Crush waste plant fibers through the grinding mill 100 and dry to form plant fiber powders; bleach the plant fiber powders and proceed a graft reaction process to activate surface fibers of the plant fiber powders.

Step S12: Add recycle rubber powders to enhance the physical properties of the plant fiber powders; next, add a homogenizing agent to fully blend and form a recycled material. By mixing the plant fiber powders and the recycle rubber powders, the physical properties of the plant fiber powders can be enhanced. By adding a homogenizing agent, the hydrophilic plant fiber powders and the lipophilic recycle rubber powders can be fully blended to form the recycled material.

Step S13: Mix the recycled material and a thermoplastic rubber (TPR) into a mixture through a twin-screw mixing machine 90; age the mixture for an aging time; then proceed a granulation process.

Step S14: Produce a shoe outsole 70 with the waste plant fibers through an injection molding process with a mold 80.

Step S15: End.

The waste plant fibers may be selected from the group consisting of pine apple leaves, sugarcane bagasse, coconut fibers, rice husks, wheat chaffs, cornstalks, and mixtures thereof. The waste plant fibers are crushed to become the plant fiber powders through the grinding mill 100. The recycle rubber powders are waste rubber going through processes such as slicing, delaminating, adsorption, crushing and drying. The crushing process also can be accomplished through the grinding mill 100. The mixing of the recycled material and the thermoplastic rubber (TPR) is performed by the twin-screw mixing machine 90. The mold 80 is used in the injection molding process to produce the shoe outsole 70 containing the waste plant fibers.

Due to human being on earth have heavily relied on petrochemical products, and the reserve of petroleum decreases rapidly and the price raises relentlessly, and carbon dioxide generated during refinery and use of petrochemical products has been identified as one of the main causes of global warming. To reduce consumption of the petrochemical products and substitute them with other materials is a critical issue at present. To better utilize the earth resources also is very important. The recycle rubber powders used in the present invention are obtained through the waste rubber of ordinary household goods, and the waste plant fibers also are recycled materials. The shoe outsoles manufactured according to the present invention can reduce the requirements of the petrochemical products. Thus by using the waste rubber and waste plant fibers to manufacture the shoe outsoles through the method of the present invention, the reusability of earth resources can be greatly improved.

In short, the present invention improves usability of waste rubber and reusability of resources, and by forming the recycle rubber powders from the waste rubber, wider applications are created. Hence it not only provides an improvement to enhance the properties of the shoe, by forming a stronger joining between the hydrophilic plant fiber powders and lipophilic thermoplastic rubber (TPR), and producing through the injection molding process, the shoe outsoles made from the waste plant fibers also offer a new direction on making shoe products.

While the preferred embodiments of the present invention have been set forth for the purpose of disclosure, modifications of the disclosed embodiments of the present invention as well as other embodiments thereof may occur to those skilled in the art. Accordingly, the appended claims are intended to cover all embodiments which do not depart from the spirit and scope of the present invention.

What is claimed is:

1. A method of manufacturing shoe outsoles from waste plant fibers, comprising the steps of:
    crushing plant wastes and drying the crushed plant wastes to become plant fiber powders, and bleaching the plant fiber powders and proceeding a graft reaction process to activate the surfaces of the plant fiber powders;
    mixing the plant fiber powders and recycle rubber powders to enhance physical properties of the plant fiber powders, and adding a homogenizing agent to fully blend the hydrophilic plant fiber powders and the lipophilic recycle rubber powders to form a recycled material; and
    mixing the recycled material and a thermoplastic rubber into a mixture and aging the mixture for an aging time and granulating the mixture, and forming a waste plant fiber shoe outsole through an injection molding process.

2. The method of claim 1, wherein the recycle rubber powders are formed by slicing, delaminating, adsorbing, crushing and drying waste rubber.

3. The method of claim 2, wherein the crushing of the waste rubber is performed through a grinding mill.

4. The method of claim 1, wherein crushing plant wastes is performed through a grinding mill.

5. The method of claim 1, wherein the shoe outsole is formed in a mold.

6. The method of claim 1, wherein the recycled material and the thermo-plastic rubber are mixed through a twin-screw mixing machine.

\* \* \* \* \*